W. J. Linton,
Band Pulley.

Nº 81,384. Patented Aug. 25, 1868.

WITNESSES.
Wm A Morgan
G. C. Cotton

INVENTOR.
W. J. Linton
per
Attorneys

United States Patent Office.

WILLIAM J. LINTON, OF DETROIT, MICHIGAN.

Letters Patent No. 81,384, dated August 25, 1868.

IMPROVED DEVICE FOR LOCKING LOOSE PULLEYS.

The Schedule referred to in these Letters Patent and making part of the same.

TO ALL WHOM IT MAY CONCERN:

Be it known that I, WILLIAM J. LINTON, of Detroit, in the county of Wayne, and State of Michigan, have invented a new and useful Improvement in Locking-Device for Loose Pulleys; and I do hereby declare that the following is a full, clear, and exact description thereof, which will enable others skilled in the art to make and use the same, reference being had to the accompanying drawings, forming part of this specification.

The object of this invention is to provide a simple and effective locking-device, to be used in machinery when pulleys or other wheels are required to run loose or fast on a shaft, for locking and unlocking them.

It consists in a hollow sleeve, provided with a screw-thread on one end, and having a long slot and two holes in the plain portion thereof, and provided with a pin, arranged to slide longitudinally in the sleeve, the said pin being provided with a spring, arranged in a longitudinal groove, and having a stud to fit the holes in the sleeve, and a set-screw working in the slot in the sleeve, to prevent the pin from turning around in the said sleeve, which is screwed into a collar on a shaft or in a fast wheel, in a manner to allow the said pin to be pushed forward into a hole in a loose wheel running adjacent to the collar or fast wheel, and locking them together, or be drawn back to allow the pulley to run loose, the said pin being locked in either position by the springs, as will be more fully described on reference to the accompanying drawings, wherein—

Figure 1:
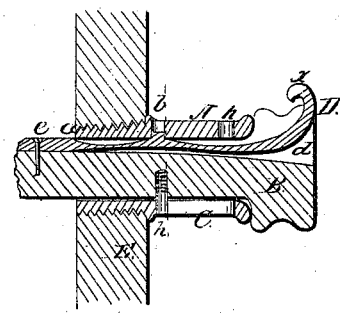
Figure 2:
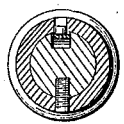

Figure 1 represents a longitudinal section of my improved locking-device and a section of a collar or wheel shown in red, and Figure 2 represents a cross-section of the same on the line $x\ x$ of fig. 1.

Similar letters of reference indicate corresponding parts.

A represents a hollow sleeve, provided with a shouldered and screwed end, $a$, and with holes $b\ b$, and a slot, C.

B represents a pin, having a milled head, and a longitudinal groove, $d$, in which is secured, at $e$, a spring, D, having a turned-up end, $f$, and which is also provided with a stud, $g$. The pin B is also provided with a pin, $h$, projecting into the slot C.

E represents, in red, what may be considered a collar, secured to a shaft, or, as in turning-lathes, it may be considered a section of the fast plate of a live spindle, and is designed to serve as a means of locking the same to the cone-pulley which runs on the shaft adjacent thereto, and which is provided with one or more holes coinciding with the hole through the sleeve A. When it is desired to lock the plate and wheel together, the pin is shoved into the position shown in the drawings, the inner end projecting into the said hole in the wheel, connecting the two rigidly together, and the stud $g$ on the spring dropping into the inner hole $b$ in the sleeve, thereby locking the pin in its position.

When it is desired to disconnect the pulley from the plate, the pin is drawn out, the spring being pressed inward by the thumb and fingers, to withdraw the stud from the hole $b$, and when released, after the pin is withdrawn, forcing the stud into the other hole, thereby locking the pin also in that position.

I claim as new, and desire to secure by Letters Patent—

The improved locking-device herein described, consisting of the sleeve, sliding pin, stationary pin, spring, and stud, all arranged substantially as set forth.

The above specification of my invention signed by me, this 11th day of April, 1868.

WILLIAM J. LINTON.

Witnesses:
WM. F. MCNAMARA,
ALEX. F. ROBERTS.